United States Patent Office 3,530,734
Patented Sept. 29, 1970

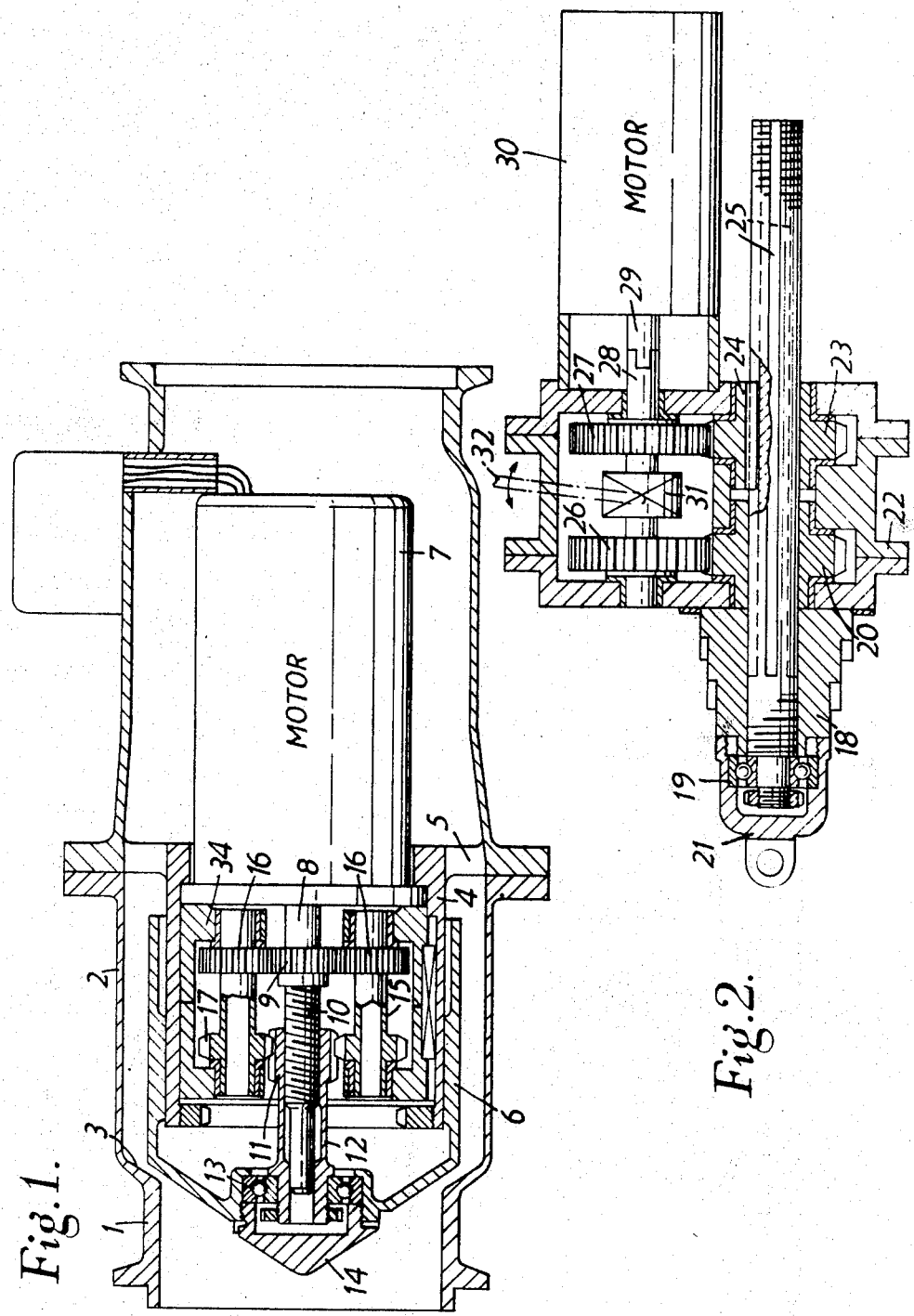

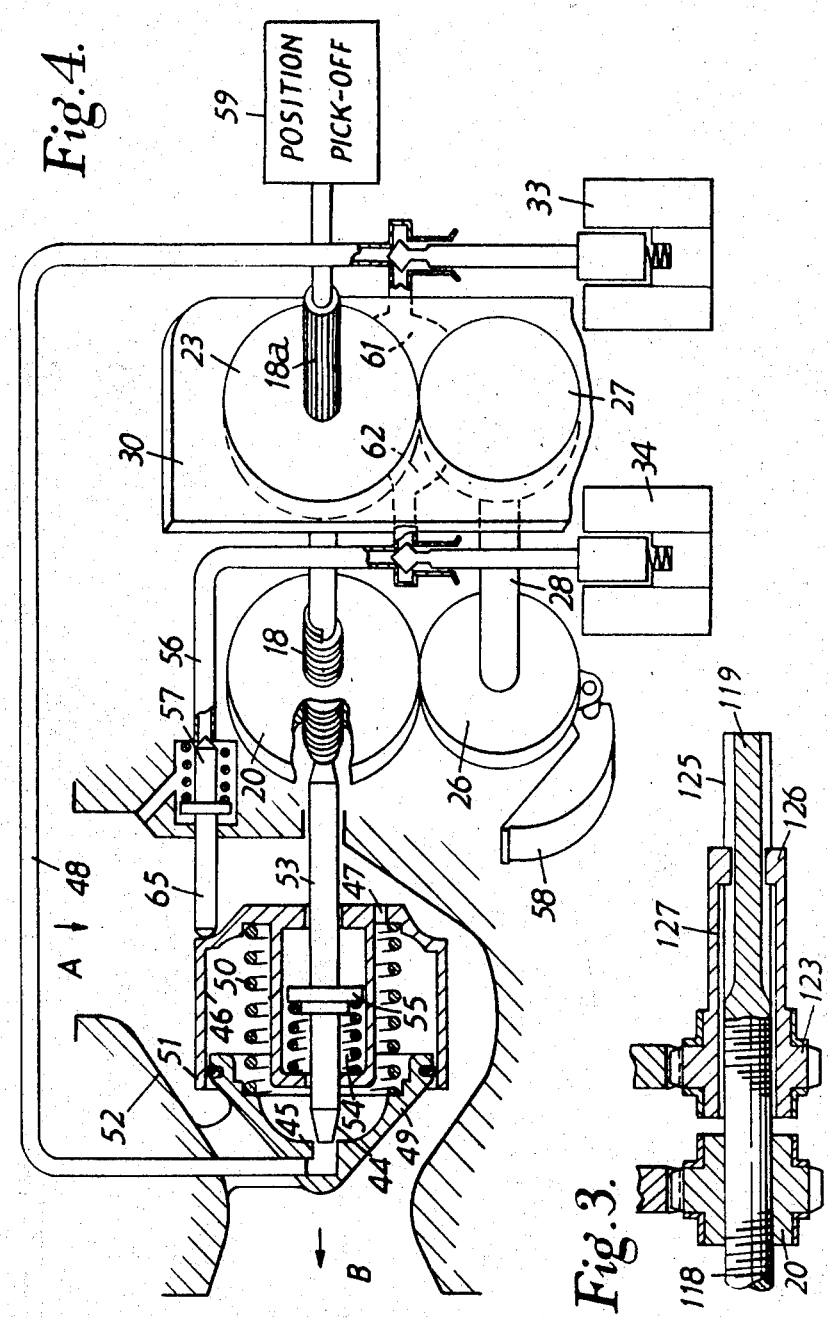

1

3,530,734
LOW-SPEED LINEAR ACTUATORS
Ronald J. Wray and Leonard T. Tribe, Ilford, England, assignors to The Plessey Company Limited, Ilford, England, a British company
Filed Sept. 27, 1968, Ser. No. 763,237
Claims priority, application Great Britain, Sept. 29, 1967, 44,571/67
Int. Cl. F16h *1/18;* F16k *31/44*
U.S. Cl. 74—424.8                    4 Claims

ABSTRACT OF THE DISCLOSURE

In a linear actuator driven by a rotary motor via a nut-and-spindle drive, both the spindle and nut are motor-driven in the same direction and are coupled by gear means which cause the two to rotate at slightly different speeds. Gear means of a lay-shaft type may be combined with the motor by enclosing two intermeshing gears of such gear means in a housing for operation as a gear-type fluid-displacement motor.

---

This invention relates to linear actuators of the kind in which movement of a rotary motor is transformed into linear movement by a nut-and-spindle drive, and it has for an object to provide an improved actuator of the kind specified which is capable of producing a very small amount of linear movement per revolution of the motor. According to the present invention both the spindle and the nut are arranged to be motor-driven in the same direction, gear means being provided which couple the spindle and nut in such manner as to cause the two to be driven at slightly different speeds. The motor and gear means may be combined by enclosing two intermeshing gears of the gear means in a housing for operation as a gear-type fluid displacement motor.

In one embodiment of the invention, which has been designed for the actuation of valves controlling the flow of gaseous medium in a duct, for example for the control of cabin-air supply ducts in an aircraft, a motor shaft is arranged coaxially with a spindle element and a nut element, and one of these elements is made integral with the motor shaft or coupled with the latter for common rotation, together with a gear, while a second gear is rotatable with the other element and is geared to the first mentioned gear by a lay shaft having two complementary gears in respective engagement with the two said gears, the transmission ratios between the lay shaft and each of the two gears coaxial with the motor spindle being slightly different in such manner that at the design speed of the motor the nut and spindle elements will rotate at speeds which differ from each other by a very small fraction of their speeds. Alternatively, the motor may be arranged to transmit its drive primarily to the lay shaft which in turn drives both the nut and spindle elements at slightly different speeds. In this case the lay shaft may be formed as an extension of the motor shaft, either integral or coupled therewith for common rotation.

Finally both shafts may be driven by means of a displacement-type fluid motor formed by two intermeshing gears of the gear drive, one on each shaft, which do not move axially relative to each other, and which are enclosed in a suitably sealed housing.

Four embodiments of the invention will now be described with reference to the accompanying drawing in which FIG. 1 is a sectional elevation of one embodiment, showing the invention applied to an air valve which, together with its actuator, is mounted inside a cabin-air supply duct,

2

FIG. 2 is a sectional elevation of a modified form of actuator according to the invention, FIG. 3 shows a modified spindle arrangement which may be substituted for that shown in FIG. 2, and FIG. 4 shows an embodiment in which a pair of gears is utilised to form a motor.

Referring now first to FIG. 1, an air duct 1 includes a widened portion 2 forming with the duct 1 a shoulder in the form of a conical valve seat 3. Guide bars 4 carried by a spider 5 guide a valve element 6 coaxially in the widened portion 2 of the duct, the guide members 4 being arranged to allow the valve element to move longitudinally but prevent it from rotation about its axis. Also coaxially supported in the widened duct portion 2 by means of a spider 5 is an electric motor 7. This motor has an extended shaft 8, which carries a pinion 9 and is provided, on part of its length outside of the pinion 9, with screw threads 10. A nut 11 cooperating with the screw threads 10 is formed at its outer side as a second pinion of greater axial length than the pinion 9 and is extended by a sleeve 12 to which the inner race of a thrust-transmitting antifriction bearing 13 is secured. The outer race of the bearing 13 is clamped, by a nut 14 in a suitable recess formed in the face of the valve member 6. Supported by bearings on two pairs of ears 34 which form part of the structure supported by the spider 5 are two mutually identical lay shafts 15, each formed with two gear elements 16 and 17 in respective engagement with the teeth of the gear 9 and of the nut 11. In a practical embodiment equipped with a motor having a normal speed of 4000 revolutions per minute, the gears 16 and 17 have respectively 19 and 20 teeth while the number of teeth on gear 9 and nut 11 are respectively 21 and 20. A simple calculation will show that in this case the motor will drive the input threaded spindle at 4000 r.p.m. and will drive the nut at $$\frac{19}{20} \times \frac{21}{20} = \frac{399}{400} \times 4{,}000 = 3{,}990 \text{ r.p.m.}$$

The speed difference between the nut and spindle is therefore as low as 10 r.p.m., an effective reduction of 400 to 1. Assuming therefore that the spindle thread has ten turns per inch, the movement of the valve will be at a rate of 1" per minute. A similar calculation will show that if the gear ratios are made 39/40 and 41/40, the same spindle will produce a movement of as little as ¼" per minute.

FIG. 2 illustrates a modified arrangement which does not require mutual axial movement of intermeshing gears, and which is therefore particularly suitable for long-stroke applications. In this arrangement a lug 21 for attachment to an element to be actuated is connected to a screw spindle 18 by a combined radial and thrust bearing 19, while a gear 20 formed as a nut co-operating with the spindle 18 is mounted in the housing 22 of the device so as to be rotatable but fixed in the axial direction. The spindle 18 is driven for rotation by a second gear 23, which is coaxial with the gear 20, and which is similarly mounted in the housing 22. This second gear 23 has an axial bore 24 through which the spindle 18 passes with clearance, and carries a spline cooperating with longitudinal grooves 25 of the spindle. Similarly to the case of FIG. 1, the gears 20 and 23 are coupled by a pair of gears 26 and 27 on a second shaft 26 which is parallel to the spindle 18 and thus corresponds to the lay shaft 15 of FIG. 1, but in contrast to FIG. 1, the shaft 29 of the motor 30 is coaxially coupled with the second shaft 28, which thus will drive the gears 20 and 23 at slightly different speeds. It is thanks to this arrangement that the rear end of the spindle 18 can freely project from the housing 22 at the side facing away from the coupling member 21, so that the apparatus can be constructed for a stroke of considerable length without thereby increasing the necessary distance between the gears 26 and 27.

We have so far assumed that both gears 26 and 27 are fixed on the shaft 28 so that both always rotate at the same speed. The embodiment of FIG. 2 shows an additional feature, which could, with some modification, also be applied to the embodiment of FIG. 1. According to this feature a combined brake and clutch device 31 is interposed between the gears 27 and 26. This device 31 is operable by a lever 32 in such a manner that when the lever is in its illustrated position (viz pointing to the right of the drawing), the two gears 26 and 27 are coupled for common rotation resulting in the described manner of operation of the drive, but reversal of the lever 32 (moving to the left as seen in the drawing) will uncouple gear 26 from gear 27 and at the same time brake the gear 26 against rotation. In this case the spindle 28 will be driven by the motor through gears 27 and 23 and the nut constituted by gear 20 will be held stationary by the gear 26, thus providing high-speed operation of the actuator output.

FIG. 3 shows a modified spindle 118 fitted with a gear nut 20 of the same construction as in FIG. 2 and with a driver gear 123 which is modified compared with gear 23 of FIG. 2. The spindle 118 is extended beyond the end of the screw thread, the extension 119 being provided with longitudinal grooves 125, and these grooves are engaged by spline portions 126 of a sleeve extension 127 of the gear 123 thus permitting the use of uninterrupted screw threads on the spindle 118.

It will be readily appreciated that, in each of the constructions described, the gears of at least one intermeshing pair are not required to perform mutual axial movement, and that moreover no axial forces will be exerted upon the gears of the lay shafts 15 or the shaft 28. It is therefore, according to a further feature of the invention, possible to render the use of a separate motor unnecessary feature is diagrammatically illustrated in FIG. 4, in which the actuator drive is somewhat similar to that in FIG. 2. The same reference numbers as in FIG. 2 have therefore been employed for the gears and screw spindle of FIG. 4. by arranging the gears of such pair in a housing to form One embodiment of the invention incorporating this jointly therewith a so-called gear pump and operating this gear pump as a hydraulic or pneumatic motor for the actuator.

Since the gears 23 and 27 perform no mutual movements in the axial direction, the gears 27 and 28 are not subject to any axial forces, the intermeshing gears 23 and 27 can be accommodated in a pump housing 30 having the usual ports 61, 62 to form a gear pump.

Solenoid valves 33 and 34 are provided which permit alternatively either fluid pressure from an inlet A to be supplied to port 61 via a port 45 and line 48 and fluid to be released from port 62, or fluid from inlet A to be supplied to port 62 via a line 56 including a valve 57 and fluid to be released from port 61, operation of the valves 33 and 34 thus causes the gear pump to act as a motor which is driven selectively in one or the other of two opposite directions. Such operation of the gear-pump motor will cause the spindle 18 and the nut constituted by the female screw threads in the bore of the gear 20 selectively to be both driven in one, or both driven in the other, of two opposite directions, the speed of rotation of the spindle being in each sense lower than that of the nut.

The end of the spindle cooperating with gear 23 is formed as a spline shaft 18a which cooperates with a correspondingly grooved central bore in the gear 23 and its journals while gear 20 with its nut-forming threaded bore is prevented from axial movement. According to the direction in which the gear-type motor 23, 27, 30 is driven, the screw spline 18 will therefore move axially to the right and left (of the drawing) respectively. The free end of the spindle 18, beyond the gear 20, engages a thrust pin 53. The latter is guided in a cup-shaped valve element 46, which sealingly cooperates with an end member 49 and is urged by a spring 50 towards an open position, in which its control edge 51 is clear of a valve seat 52 in the main passage from inlet A to an outlet B, the force of the spring 50 being transmitted to the thrust pin 53 by a stronger spring 54, which acts on a collar 55 of the thrust rod 53 to hold the latter in contact with the end of the spindle 18.

The thrust rod 53 carries an auxiliary valve element 44 for cooperation with a valve seat 45, whilst the valve element of the normally open valve 57 provided in the pressure-inlet line 56 is extended by an actuator pin 65, which is engaged by the valve element 46 so as to close the valve 57 and thus cut off the fluid supply to motor port 62 when the valve element 46 approaches its fully open position. The valve element 46 is perforated at 47 so that its interior freely communicates with the pressure inlet A.

When the motor 23, 27, 30 is operated to move the spindle 18 to the left of FIG. 4, this movement will be transmitted via the pin 53 and spring 54 to the cap-shaped valve element 46, causing the latter to progressively close the passage from inlet A to outlet B by cooperation of its edge 51 with the valve seat 52. When the said passage is fully closed, further movement of the motor will cause the thrust pin 53 to move further while the valve element 46 is prevented from participating in this movement, this further movement of pin 53 being permitted by compression of the spring 54, until the valve element 44 associated with the pin 53 engages seat 45 and thus cuts off the supply of fluid under pressure to the motor port 61 via line 48. The movement of the motor is thereby arrested even if the positions of the valves 33 and 34 remain unchanged. If the flow from A to B is to be restored, the positions of valves 33, 34 are reversed, thus admitting fluid from line 56 to port 62 and allowing fluid to escape from port 61, and the resulting movement of the motor in the opposite direction causes the spindle 18 to move towards the right-hand side of the drawing, followed by the thrust rod 53 and, after the spring 54 has expanded to its original length, by the cap-shaped valve element 46. The opening movement of the valve element 46 continues until either the solenoid 33 is deenergized or the valve element 46 has moved so far away from its seat 52 that, by striking the stem 65, it closes the valve 57, thus cutting off the supply of air from inlet A to chamber 62 via line 56.

The mechanism of FIG. 4 is further equipped with a centrifugal brake 58 in order to prevent the speed of the motor 23, 27, 30, from rising above a predetermined maximum, and a position pick-off device 59 is provided to give an indication of the varying position of the spindle 18 and thus of the valve 46.

Various modifications of the embodiments described are possible within the scope of the invention. Thus the gear ratios in the embodiment of FIG. 4 may be so varied that the gear nut member 20 rotates at a higher speed than the spindle 18 in which case the direction of valve movement for a given direction of motor rotation is reversed.

What we claim is:

1. A linear actuator having a shaft element, nut and spindle means adapted for transforming rotary movement of said shaft into linear movement of an output element, wherein both the spindle and the nut are arranged to be driven in the same direction, gear means which couple the spindle and the nut in such manner as to cause the two to be driven at slightly different speeds and a pair of intermeshed gears forming part of said gear means and contained within a housing to define at least part of a gear-type fluid displacement motor.

2. A linear actuator as claimed in claim 1 wherein the nut and spindle means comprises a screw threaded spindle element and a nut element which cooperates with said spindle element and wherein said gear means comprises a first gear connected to said spindle element for common coaxial rotation therewith, a second gear of different effective diameter which is connected to said nut element for common rotation coaxially with said nut element and said first gear element, a third and fourth gear element connected to said shaft for rotation therewith and arranged for respective intermeshing engagement with said first and second gear elements to define a pair of intermeshing gears, said shaft element being arranged parallel to said spindle element, and wherein said output element derives linear output movement from one element of said nut and spindle means.

3. A linear actuator as claimed in claim 2 which includes a disengageable clutch interposed in the connection between said third and fourth gear elements and associated with means which when said clutch device is disengaged prevent rotation of one of the pairs of intermeshing gears.

4. A linear actuator as claimed in claim 2 wherein one of said pairs of intermeshing gears is enclosed in a sealed pump housing and secured against mutual axial displacement.

References Cited

UNITED STATES PATENTS

| | | | |
|---|---|---|---|
| 1,777,115 | 9/1930 | Bruback et al. | 74—424.8 X |
| 2,502,573 | 4/1950 | Lee II | 74—405 |
| 2,630,022 | 3/1953 | Terdina | 74—424.8 |
| 2,860,266 | 11/1958 | Schrader | 310—112 |
| 3,407,680 | 10/1968 | Westmoreland | 74—424.8 |
| 3,449,971 | 6/1969 | Posh | 74—424.8 |

LEONARD H. GERIN, Primary Examiner

U.S. Cl. X.R.

251—264